(12) United States Patent
Randria et al.

(10) Patent No.: US 9,768,667 B2
(45) Date of Patent: Sep. 19, 2017

(54) ELECTRIC MOTOR WITH OUTER RADIATOR AND TWO SEPARATE COOLING CIRCUITS

(71) Applicant: ALSTOM TRANSPORT TECHNOLOGIES, Saint-Quen (FR)

(72) Inventors: Andry Randria, Besancon (FR); Bruno Raguin, Beure (FR)

(73) Assignee: Alstom Transport Technologies, Saint-Ouen (FR)

( * ) Notice: Subject to any disclaimer, the term of this patent is extended or adjusted under 35 U.S.C. 154(b) by 0 days.

(21) Appl. No.: 15/018,401

(22) Filed: Feb. 8, 2016

(65) Prior Publication Data

US 2016/0233743 A1 Aug. 11, 2016

(30) Foreign Application Priority Data

Feb. 6, 2015 (FR) ...................... 15 50941

(51) Int. Cl.
*H02K 9/18* (2006.01)
*H02K 9/06* (2006.01)
*H02K 1/20* (2006.01)

(52) U.S. Cl.
CPC ................. *H02K 9/06* (2013.01); *H02K 1/20* (2013.01); *H02K 9/18* (2013.01)

(58) Field of Classification Search
CPC ............... H02K 9/18; H02K 9/06; H02K 1/20
See application file for complete search history.

(56) References Cited

U.S. PATENT DOCUMENTS

| 3,643,119 A * | 2/1972 | Lukens | ..................... H02K 9/06 |
| | | | 310/60 R |
| 6,891,290 B2 * | 5/2005 | Nagayama | ............... H02K 1/32 |
| | | | 310/58 |

\* cited by examiner

*Primary Examiner* — Dang Le
(74) *Attorney, Agent, or Firm* — Knobbe Martens Olson & Bear LLP

(57) ABSTRACT

A motor includes a frame defining an internal volume in which are housed a rotor and a stator; at least one cooling circuit, which includes a primary inlet and a primary outlet in fluidic communication with the outside of the frame; at least one cooling device outside the frame, which includes a secondary air inlet and a secondary air outlet, and a conduit; at least one secondary cooling circuit, separate from the primary circuit, crossing the rotor and in fluidic communication with the secondary inlet and the secondary outlet of the cooling device. The secondary cooling circuit is crossed by a channel of the primary cooling circuit supplying the stator with the gas fluid from the outside of the frame.

9 Claims, 1 Drawing Sheet

ELECTRIC MOTOR WITH OUTER RADIATOR AND TWO SEPARATE COOLING CIRCUITS

CROSS-REFERENCE TO RELATED APPLICATION

This application claims priority to French Patent Application No. 15 50941 filed on Feb. 6, 2015, the disclosure of which including the specification, the drawings, and the claims is hereby incorporated by reference in its entirety.

FIELD OF THE INVENTION

The present invention relates to an electric motor, including a primary cooling circuit for cooling a stator and a secondary cooling circuit for cooling a rotor.

BACKGROUND OF THE INVENTION

Usually, the primary cooling circuit is in fluidic communication with the outside of the frame of the motor so as to allow cooling of the stator by having ambient air circulate in the primary cooling circuit. Generally, the secondary circuit is, as for it not in fluidic communication with the outside of the frame of the electric motor in order to avoid that dust or other materials jam or foul the mobile portion of the motor. Consequently, the secondary circuit is connected to a cooling device extending outside the motor, so as to allow a heat exchange between the fluid gas circulating in a closed circuit in the secondary circuit and outdoor air through the wall of the cooling device.

Such an electric motor is for example described in document U.S. Pat. No. 6,891,290.

However, the architecture of such an electric motor implies that the secondary cooling circuit of the rotor crosses the primary cooling circuit of the stator. This crossing of both circuits hampers the cooling efficiency of the primary cooling circuit of the stator since the total volume of the primary cooling circuit has to be limited in order to let through the secondary cooling circuit.

SUMMARY OF THE INVENTION

One of the objects of the invention is to propose an electric motor comprising cooling circuits allowing efficient and simple cooling of the stator and of the rotor of the electric motor.

For this purpose, the object of the invention is an electric motor, including
 a frame defining an inner volume in which a rotor and a stator are housed,
 at least one primary cooling circuit crossing the stator, comprising a primary inlet and a primary outlet in fluidic communication with the outside of the frame, a gas fluid from the outside of the frame penetrating through said primary inlet being intended to circulate in said primary cooling circuit and to leave said circuit through said primary outlet,
 at least one cooling device outside the frame comprising a secondary air inlet and a secondary air outlet, said secondary inlet and said secondary outlet being in fluidic communication with the internal volume of the frame, one conduit, connecting said secondary inlet and said secondary outlet, extending at least partly outside the frame,
 at least one secondary cooling circuit, separated from the primary circuit, crossing the rotor and in fluidic communication with the secondary inlet and the secondary outlet of the cooling device, a gas fluid internal to the secondary cooling circuit being intended to circulate in said secondary cooling circuit and in said outer cooling device, characterized in that the secondary cooling circuit is crossed by a channel of the primary cooling circuit supplying the stator with the gas fluid from the outside of the frame.

The advantages of such an electric motor are multiple and are summarized in a non-exhaustive way below.

The circuit of the primary cooling of the stator gives the possibility of cooling the stator of the electric motor efficiently, which allows an increase in the lifetime of the motor and/or having it operate at a higher power since it is no longer necessary to interrupt the primary cooling circuit for letting through the secondary cooling circuit. The total volume of the primary cooling circuit is therefore increased so that the amount of gas fluid for cooling is larger.

The primary circuit according to the invention also gives the possibility of improving the cooling of the secondary circuit by giving the possibility of having a second heat exchange area between the outdoor air and the gas fluid circulating in the secondary cooling circuit in addition to the heat exchange area extending on the outside of the frame of the motor. Indeed, a heat exchange is established between the air from the outside circulating in the primary cooling circuit and the gas fluid circulating in the secondary cooling circuit at the channel of the primary cooling circuit crossing the secondary cooling circuit.

Advantageously, an electric motor according to the invention may include one or several of the following features, taken alone or according to all the technically conceivable combinations:
 the channel crosses the secondary cooling circuit transversely so as to separate the gas flow circulating in the secondary cooling circuit into two flows passing around the channel;
 the channel crosses the secondary cooling circuit mainly in a direction substantially parallel to an axis of rotation of a shaft of the motor;
 the channel is laid out between the primary inlet and a portion of the primary cooling circuit crossing the stator;
 the channel includes a section with a conical shape with an apex turned upstream of the air flow and a base turned downstream;
 the channel includes a diameter between 10 and 50 mm;
 several cooling devices outside the frame are arranged around the frame;
 a radial fan is mounted on the shaft of the motor in order to accelerate a gas flow in the secondary cooling circuit;
 the radial fan gives the possibility of simultaneously accelerating a gas flow in the primary cooling circuit and a gas flow in the secondary cooling circuit;
 the fan is configured so as to generate a pressure in the secondary cooling circuit which is greater than a pressure in the primary cooling circuit.

BRIEF DESCRIPTION OF THE DRAWINGS

The invention will be better understood upon reading the description which follows, only given as an example and made with reference to the drawings wherein.

DETAILED DESCRIPTION

Figure 1:
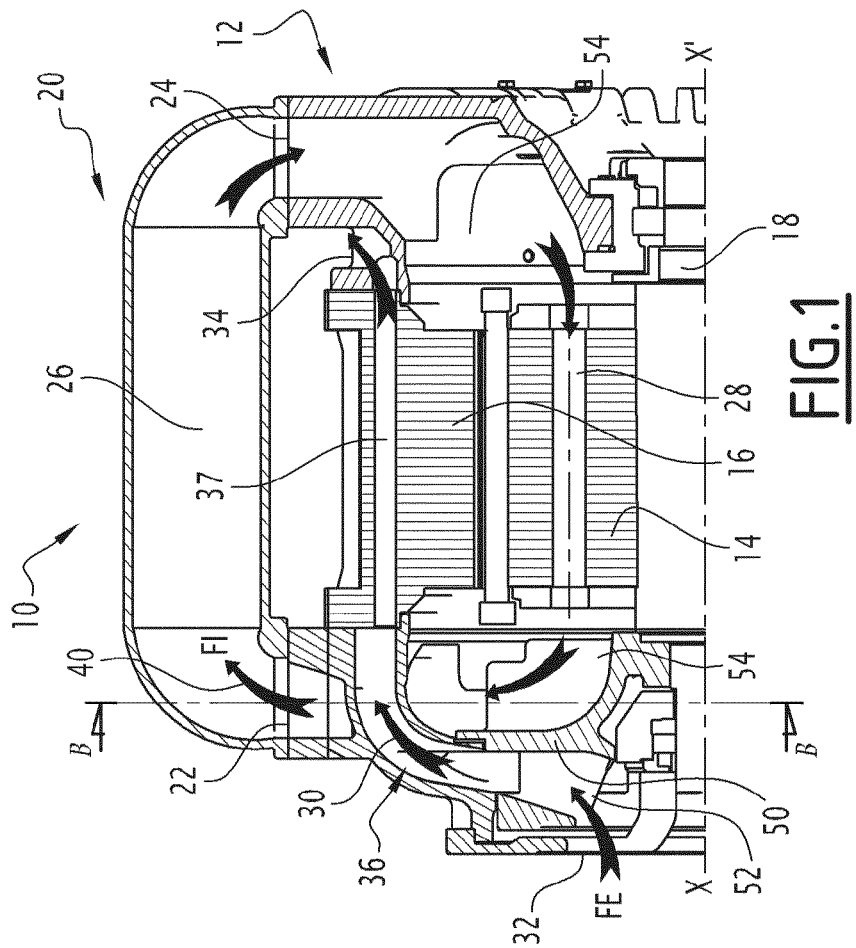
FIG. 1 is a partial sectional view along the direction of the axis of rotation X-X' of the rotor.
Figure 2:
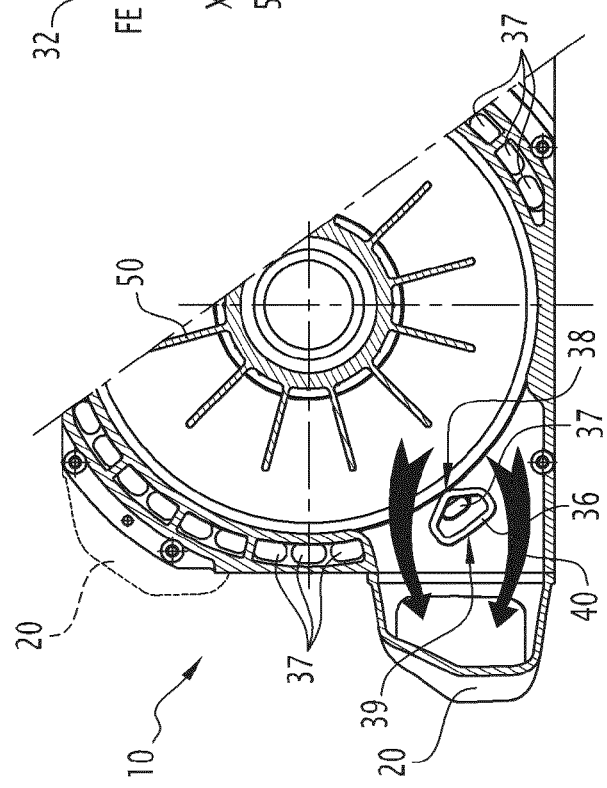
FIG. 2 is a partial sectional view along the plane B-B of FIG. 1.

An electric motor 10 according to a first embodiment of the invention is illustrated in FIGS. 1 and 2. The electric motor 10 comprises a frame 12 defining a volume internal to the motor 10 in which is housed a rotor 14 and a stator 16. The rotor 14 is mounted so as to rotate therewith on a rotational shaft 18 inside the frame 12 and mounted so as to be rotatable around an axis of rotation X-X' relatively to the stator 16. The stator 16 surrounds the rotor 14 parallel to the axis of rotation X-X' inside the frame 12. Conventionally, the rotor 14 and the stator 16 give the possibility of transforming electric energy into a mechanical energy delivered by the shaft 18 of the rotor 14.

According to an embodiment, a primary cooling circuit 30 includes a primary inlet 32 and a primary outlet 34, each being in fluidic communication with the outside of the frame 12. By this, it is meant that ambient air is able to penetrate into the primary cooling circuit 30 through the primary inlet 32 and to return to the outside through the primary outlet 34. The primary inlet 32 and the primary outlet 34 are connected together by at least one primary conduit 37 crossing the stator 16 and for example extending along an axis substantially parallel to the axis of rotation X-X'.

The primary cooling circuit 30, illustrated in FIG. 1, allows a gas fluid, i.e. ambient air, from the outside of the frame 12 to rush into the primary inlet 32. The external gas fluid EF is guided by the primary cooling circuit 30 through the internal volume of the frame 12 and more particularly through the stator 16 in order to cool the latter. The primary conduit 37 actually allows heat exchange between the external gas fluid EF and the stator 16. The primary outlet 34 finally allows discharge of the heated up external gas fluid EF towards the outside of the frame 12. Thus, the frame 12 and the stator 16 are cooled by the ambient air from the surroundings of the motor 10.

In the present description, the terms of "upstream2 and "downstream" are defined relatively to the direction of circulation of a gas fluid flow in the motor 10.

A secondary cooling circuit 40, illustrated in FIG. 1, comprises at least one tunnel 28. This tunnel 28 is connected to its ends through two radial passages to the inlet 22 and the outlet 24 of the cooling device 20. The tunnel 28 substantially extends parallel to the axis of rotation X-X', and thus forms at least one aperture across the rotor 14.

The circuit 40 is isolated from the primary cooling circuit 30, i.e. there is no fluidic communication between the primary cooling circuit and the secondary cooling circuit. An inner gas fluid IF fills the secondary cooling circuit 40. This gas fluid, for example air, is isolated from ambient air since there is no fluidic communication between the secondary cooling circuit and the outside of the frame.

A cooling device 20 outside the frame 12 is connected through a secondary air inlet 22 and a secondary air outlet 24 to the secondary cooling circuit extending in the internal volume of the frame. The secondary air inlet 22 and the secondary air outlet 24 are in fluidic communication with each other and are connected through a secondary conduit 26.

The shaft 18 of the rotor 14 is equipped with a fan 50 including at least two secondary blades 54 able to have the inner gas fluid IF circulate inside the secondary circuit 40 and of the cooling device 20. The circulation of the gas fluid is called secondary gas flow. The secondary blades 54 are for example located upstream from the secondary inlet 22 of the cooling device 20 and downstream from the secondary outlet 24 of the cooling device 20. The fan 50 is for example a radial fan extending in the internal volume of the frame 12 of the motor 10. Thus, an inner gas flow is generated conducting the inner gas fluid IF from the rotor 14 to the cooling device 20 and from the cooling device 20 to the rotor 14.

The circulation of the gas fluid between the secondary cooling circuit 40 and the cooling device 20 allows the inner gas fluid IF to be cooled in the cooling device 20 by heat exchange between the inside of the cooling device 20 and ambient air and to be circulated in the rotor 14 in order to cool the latter. The heated up inner gas fluid IF during its passing through at least one tunnel of the rotor 14 is then sent towards the external cooling device 20 where it is again cooled by heat exchange with ambient air upon its passing through the secondary conduit 26 of the cooling device 20. Thus, the rotor 14 is cooled by the internal gas fluid IF.

According to an embodiment, the fan 50 is also laid out for promoting circulation of the air in the primary cooling circuit, for example by means of at least one primary blade 52 able to generate a primary gas flow intended to circulate in the primary cooling circuit 30. The primary blade 52 is for example located downstream from the primary inlet 32 and upstream from the primary conduit 37 of the primary cooling circuit 30. Thus, the fan 50 gives the possibility of simultaneously generating a gas flow in the primary cooling circuit 30 and a gas flow in the secondary cooling circuit 40.

The secondary blades 54 each have a diameter greater than that of the primary blade 52. Thus, the pressure inside the secondary cooling circuit 40 is greater than the pressure inside the primary cooling circuit 30. In this case, the seal is guaranteed between the primary cooling circuit 30 and the secondary cooling circuit 40.

According to the invention, the secondary cooling circuit 40 is crossed by a channel 36 of the primary cooling circuit 30 feeding the stator 16 with the external gas fluid. The channel 36 is for example interposed between the primary inlet 32 and the conduit 37 crossing the stator 16, i.e. the channel 36 is in fluidic communication, with the primary inlet 32 of the primary cooling circuit 30 on the one hand and with the conduit 37 crossing the stator 16 on the other hand. Such a channel 36 gives the possibility of having the secondary cooling circuit 40 cross the primary cooling circuit 30 without having to interrupt or reduce the diameter of the secondary cooling circuit 40. Further, the channel 36 forms an additional heat exchange area between the external gas fluid EF circulating in said channel 36 of the primary cooling circuit 30, and the internal gas fluid IF circulating in the secondary cooling circuit 40 in addition to the heat exchange area extending at the cooling device 20.

According to the described embodiment, the channel 36 has a greater diameter than a primary conduit 37 of the primary cooling circuit 30. This gives the possibility of supplying several primary conduits 37 of the primary cooling circuit 30 with the external gas fluid simultaneously. The diameter of the primary conduit 37 is for example comprised between 10 and 50 mm. For example, forty primary conduits 37 are fed by the channel 36 of the primary cooling circuit 30.

In this case, the channel 36 allows a sufficient supply of external gas fluid in order to efficiently cool the stator 16 of the motor 10.

As this is illustrated in FIG. 2, the channel 36 crosses the secondary cooling circuit 40 so as to separate a flow of the internal gas fluid into two flows respectively passing on one side of the channel 36. Both separated flows of the internal gas fluid are thus cooled by the channel 36.

The channel 36 crosses the secondary cooling circuit 40 mainly in a direction substantially parallel to the axis of rotation X-X' of the shaft 18 of the motor 10.

The channel 36 is located downstream from the primary inlet 32 and upstream from at least one primary conduit 37 of the primary cooling circuit. Thus, it is guaranteed that the external gas fluid crossing the channel 36 is not again heated by the stator 16 of the motor 10. In this case, the external gas fluid may cool the internal gas fluid through the primary conduit 37.

The channel 36 locally reduces the volume of the secondary cooling circuit 40 and thus generates a Venturi effect in the secondary cooling circuit 40. By this effect, the flow of the inner gas fluid IF is accelerated at the channel 36, which allows an increase in the heat exchange between the channel 36 and the inner gas fluid IF.

The channel 36 of the primary cooling circuit 30 crosses the secondary cooling circuit 40 upstream from the cooling device 20 of the secondary cooling circuit 40. This allows cooling of the internal gas fluid IF of the secondary cooling circuit 40 by the channel 36.

According to an embodiment, the channel 36 has a section of conical shape with an apex 38 extending towards the upstream portion of the internal gas fluid IF of the secondary cooling circuit 40 and a base 39 extending towards the downstream portion of this internal gas fluid IF, as illustrated in FIG. 2. Thus, the perturbations of the gas flow by the channel 36 are reduced. Various other aerodynamic shapes of the section of the channel 36 may be contemplated, for example in order to increase the heat exchange between the secondary cooling circuit 40 and the primary cooling circuit 30 and/or for modifying the secondary flow.

In a second embodiment, several cooling devices 20 are arranged around the frame 12 of the motor 10 (see FIG. 2). Each cooling device 20 is in fluidic communication with said or one secondary cooling circuit 40. All the secondary cooling circuits 40 cross the rotor 14 of the motor 10. Thus, the cooling of the motor 10, in particular of the rotor 14, is increased. This gives the possibility of increasing the performance level of the motor 10, while guaranteeing optimum, efficient and simple cooling.

The total cooling of the motor 10 produced by the primary cooling circuit 30 and by the secondary cooling circuit 40 has at least a power of 12 kW.

The mechanical power delivered by the shaft 18 of the motor 10 is of at least 400 kW.

What is claimed is:

1. An electric motor, comprising:
   a frame defining an internal volume in which are housed a rotor and a stator,
   at least one primary cooling circuit crossing the stator, comprising a primary inlet and a primary outlet in fluidic communication with the outside of the frame, a gas fluid from the outside of the frame penetrating through said primary inlet being intended to circulate in said primary cooling circuit and to leave said primary cooling circuit through said primary outlet,
   at least one cooling device outside the frame comprising a secondary air inlet and a secondary air outlet, said secondary air inlet and said secondary air outlet being in fluidic communication with the internal volume of the frame, a conduit, connecting said secondary air inlet and said secondary air outlet, extending at least partly outside the frame,
   at least one secondary cooling circuit, separate from the primary cooling circuit, crossing the rotor and in fluidic communication with the secondary air inlet and the secondary air outlet of the cooling device, a gas fluid internal to the secondary cooling circuit being intended to circulate in said secondary cooling circuit and in said cooling device,
   wherein the secondary cooling circuit is crossed by a channel of the primary cooling circuit supplying the stator with the gas fluid from the outside of the frame, and
   wherein the channel includes a section with a conical shape with an apex turned upstream of the air flow and a base turned downstream.

2. The electric motor according to claim 1, wherein the channel crosses the secondary cooling circuit transversely so as to separate the gas flow circulating in the secondary cooling circuit into two flows passing around the channel.

3. The electric motor according to claim 1, wherein the channel crosses the secondary cooling circuit mainly in a direction substantially parallel with an axis of rotation of a shaft of the electric motor.

4. The electric motor according to claim 1, wherein the channel is laid out between the primary inlet and a portion of the primary cooling circuit crossing the stator.

5. The electric motor according to claim 1, wherein the channel includes a diameter between 10 and 50 mm.

6. The electric motor according to claim 1, wherein several cooling devices outside the frame are arranged around the frame.

7. The electric motor according to claim 1, wherein a radial fan is mounted on the shaft of the electric motor in order to accelerate a gas flow in the secondary cooling circuit.

8. The electric motor according to claim 7, wherein the radial fan allows simultaneous acceleration of a gas flow in the primary cooling circuit and of a gas flow in the secondary cooling circuit.

9. The electric motor according to claim 7, wherein the fan is configured so as to generate a pressure in the secondary cooling circuit which is greater than a pressure in the primary cooling circuit.

* * * * *